Figure 1:
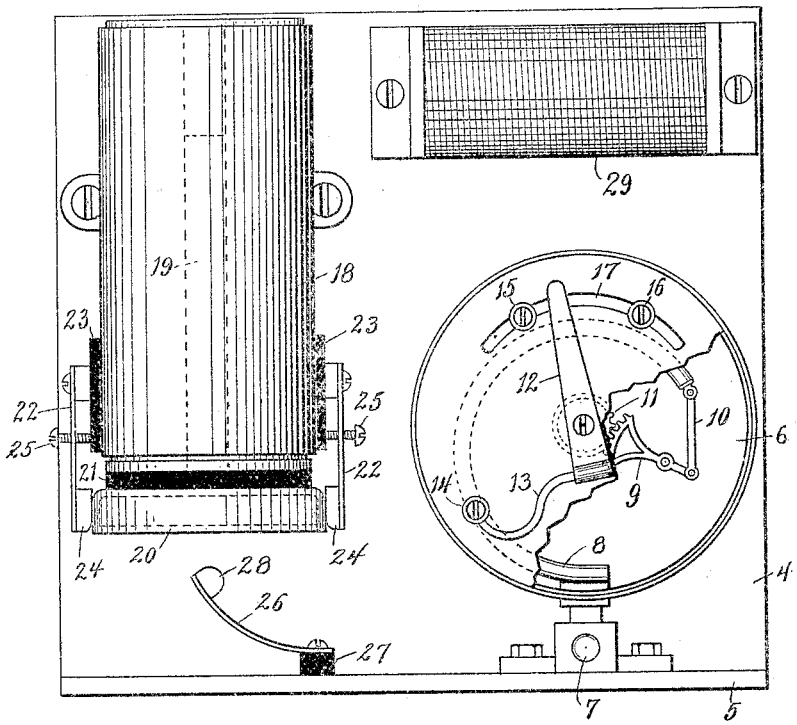

No. 822,223. PATENTED MAY 29, 1906.
W. J. RICHARDS.
AUTOMATIC CONTROLLER FOR PRESSURE SYSTEMS.
APPLICATION FILED APR. 6, 1905.

2 SHEETS—SHEET 1.

Witnesses.
C. H. Keeney,
R. S. C. Caldwell.

Inventor.
Walter J. Richards
By Benedict & Morsell
Attorneys.

No. 822,223. PATENTED MAY 29, 1906.
W. J. RICHARDS.
AUTOMATIC CONTROLLER FOR PRESSURE SYSTEMS.
APPLICATION FILED APR. 6, 1905.

2 SHEETS—SHEET 2.

Witnesses.
C. H. Keeney,
R. S. C. Caldwell.

Inventor.
Walter J. Richards
By Benedict & Morsell
Attorneys.

UNITED STATES PATENT OFFICE.

WALTER J. RICHARDS, OF MILWAUKEE, WISCONSIN.

AUTOMATIC CONTROLLER FOR PRESSURE SYSTEMS.

No. 822,223.　　　Specification of Letters Patent.　　　Patented May 29, 1906.

Original application filed March 9, 1904, Serial No. 197,317. Divided and this application filed April 6, 1905. Serial No. 254,256.

*To all whom it may concern:*

Be it known that I, WALTER J. RICHARDS, residing in Milwaukee, in the county of Milwaukee and State of Wisconsin, have invented new and useful Improvements in Automatic Controllers for Pressure Systems, of which the following is a description, reference being had to the accompanying drawings, which are a part of this specification.
This invention relates to new and useful improvements in automatic controllers for pressure systems, and has for its object to provide means under the influence of the pressure in the pressure system for automatically starting the operation of the compressor of said pressure system when the pressure of the system reaches a predetermined minimum and for also automatically stopping the operation of the compressor when the pressure in the system reaches a predetermined maximum, thereby maintaining an approximately constant degree of pressure in the system.

Another object of this invention is to accomplish the automatic operation of the compressor of a pressure system by means of a magnetically-operated switch in combination with a primary or pressure switch sensitive to variations of the pressure in the pressure system, said magnetic switch having its magnet-windings so connected that the magnet becomes energized as the result of one contact made by the pressure-switch and becomes deënergized by having its magnet-windings connected in opposition to each other to neutralize their effects as the result of another contact made by the primary switch.

Another object of this invention is to provide an automatic pressure-controller for pressure systems comprising a motor-compressor, a magnetic switch for controlling the motor-circuit, and a pressure-switch sensitive to variations of the pressure in the pressure system for establishing an energizing-circuit through a magnet-winding of the magnetic switch by one contact thereof, said magnetic switch being operated as the result of its magnet being energized by this circuit and serving to establish the motor-circuit and to short-circuit the said contact of the pressure-switch and the magnet-winding above mentioned and substituting a protective resistance in series with another magnet-winding of the magnetic switch, said magnet-winding and protective resistance being in shunt with the motor, the pressure-switch being adapted to make another contact for opposing one magnet-winding to the other, and thus neutralizing the magnet and permitting the switch to open.

Another object of this invention is to provide a suitable mechanical construction for accomplishing the foregoing objects.

With the above and other objects in view the invention consists in the controller system and apparatus, the parts and combinations of parts, as herein set forth, and all equivalents.

Figure 2:
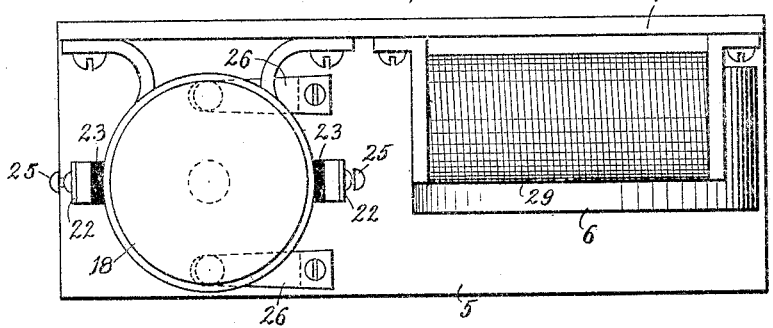
Figure 3:
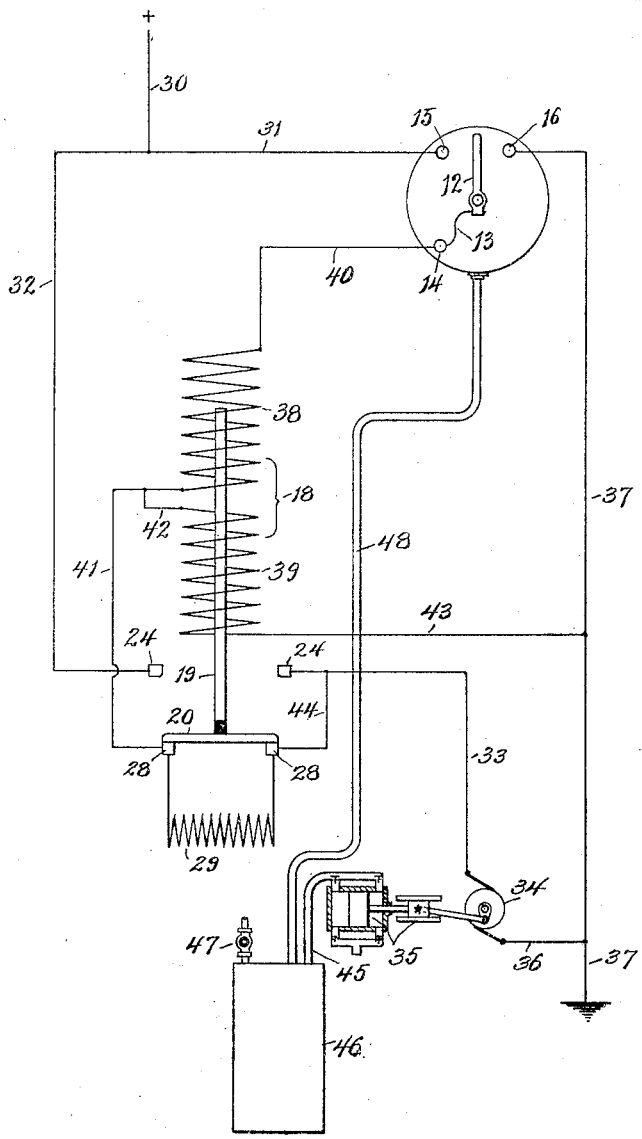

Referring to the accompanying drawings, in which like characters of reference indicate the same parts in the several views, Figure 1 is a front elevation of a controller constructed in accordance with this invention and constituting an exemplification thereof. Fig. 2 is a plan view thereof, and Fig. 3 is a diagram showing the electrical and pneumatic connections involved in the system of pressure control of this invention.

In the drawings, 4 represents a vertical base-plate which is preferably rectangular in shape, as here shown, and is provided with an outstanding integral flange 5 at its lower edge, serving as a support for a pressure-switch 6. The pressure-switch is preferably of the pressure-gage type, with a base or connection 7 to connect a pressure-pipe of a fluid-pressure system with a closed spring-tube 8, which is known as a "Bourdon" tube and is adapted to expand and contract its curved form as the result of variations in pressure in the pressure system. The Bourdon tube 8 is contained within a suitable casing, to which is pivoted a segmental rack-lever 9, having a link connection 10 with the free end of the Bourdon tube and having its teeth meshing with a pinion 11, which is journaled in the casing and carries a gage-hand 12. The gage-hand 12 has a flexible electrical connection 13 with a binding-post 14 and is adapted in its movements received from the Bourdon tube through the connection therewith to contact with a minimum contact-post 15 when the pressure in the system reaches its minimum and to contact with a maximum contact-post 16 when the pressure in the pressure system reaches its maximum. The contact-posts 15 and 16 constitute binding-posts, which are adjustable in a curved slot 17 of the casing to regulate the contacts made by the gage-hand to occur at the desired limits of pressure in the pressure system.

At the upper left-hand corner of the base 4 is secured a vertical solenoid 18, whose core 19 carries at its lower end a disk-shaped contact 20, which is insulated from the core by an insulating-disk 21, of fiber or other suitable material. On each side of the solenoid-casing is secured a leaf-spring 22, which is insulated therefrom by a strip 23 of fiber or the like and which carries a contact-shoe 24 on its lower depending end. An adjusting-screw 25 is threaded through the spring 22 and bears on the insulating-strip 23 for adjusting the position of the contact-shoe, so that when the solenoid-core 19 is attracted it lifts the disk contact 20 into sliding engagement with the spring-contacts 24 and establishes a connection from one of said spring-contacts to the other.

Beneath the solenoid 18 a pair of upwardly-bent spring-arms 26 are mounted upon the horizontal flange 5, with insulating-blocks 27 therebeneath, and have rounded contact-shoes 28 on their upper ends to engage with and be electrically connected by the disk contact 20 when in its lower position during the time that the solenoid 18 is deënergized. An object in bending the spring-arms 26 upwardly is to cause them to yield on the downward movement of the disk contact 20 and serve to support said contact with spring-pressure, and thereby assist the solenoid when it is again energized in quickly lifting the contact.

At the upper right-hand corner of the base 4 and above the pressure-switch 6 is located a coil of resistance-wire 29 for a purpose to be later described.

Referring now to the diagram shown in Fig. 3, the electrical and pneumatic connections for the several parts constituting the mechanical construction of the controller above described will be explained. A wire 30 leading from any suitable source of electrical supply (usually the trolley when the controller is used in connection with an air-brake system) connects with a wire 31, leading to the minimum contact-post 15 of the pressure-switch, and with a wire 32, leading to one of the spring-contacts 24 of the solenoid-operated switch. The other contact 24 of the solenoid-operated switch connects by means of a wire 33 with the motor 34 of a motor-compressor 35, said motor having connection by means of a wire 36 with a wire 37, leading to the ground. The solenoid 18 has its winding formed in two parts 38 and 39, respectively, the former having one end connected by a wire 40 with the binding-post 14 of the pressure-switch and its other end connected by a wire 41 with one of the spring-contacts 28 and the latter having one end connected by a wire 42 with said wire 41 and the other end connected by a wire 43 with the wire 37, previously referred to, which leads from the maximum contact-post 16 of the pressure-switch to the ground. The resistance-coil 29 has its ends connected with the respective spring-contacts 28, and a wire 44 connects the spring-contact 28 which is not connected to wire 41 with wire 33. The motor-compressor 35 serves during its operation to compress air and force it through a pipe 45 into a compressed-air reservoir 46, which, besides having a service-outlet 47, has a pipe 48 connecting it with the pressure-switch.

As long as the pressure within the pressure system remains normal the gage-hand 12 will remain out of contact with the contact-posts 15 and 16 and no circuit will be complete, the motor-switch being open and the motor-compressor standing idle. When, however, the pressure in the system is reduced to its minimum as the result of service use, the gage-hand 12 contacts with the minimum contact-post 15 and establishes a circuit to energize the solenoid 18 and close the motor-switch. The circuit established by this contact of the pressure-switch is from wire 30 through wire 31 to the minimum contact-post 15, through the gage-hand 12 in contact therewith and its flexible conductor 13 to the binding-post 14, through wire 40 to solenoid-winding 38, through wire 41 to one contact 28, across the switch-contact 20 to the other contact 28, by way of wires 44 and 33 to the motor 34, and through the motor and wires 36 and 37 to the ground. In tracing the circuit above described no mention is made of current passing from the point in common between the two solenoid-windings 38 and 39 through the latter and by way of wires 43 and 37 to the ground, because the resistance of the motor is so small in comparison to the resistance of solenoid-winding 39 that practically no current passes through said solenoid-winding. However, such current as might do so would have the tendency to assist the solenoid-winding 38 in lifting the core.

The closing of the main or magnetic switch which results from the energizing of solenoid 18 establishes the motor-operating circuit, current passing from wire 30 through wire 32 to a spring-contact 24, across the switch-contact 20 to the other spring-contact 24, through wire 33 to the motor 34, and through wires 36 and 37 to the ground. This causes the motor to operate and restore pressure to the reservoir 46. The closing of the magnetic switch also shunts the coil 38 and the contact made at the pressure-switch between the gage-hand 12 and the minimum contact-post 15, since current may then pass from the wire 33, by way of wire 44, and through the protective resistance 29 to reach the dividing-point between the two solenoid-windings instead of traversing the switch-contact and the solenoid-winding 38 in order to reach this point. Thus the solenoid-winding 38 and the minimum contact of the pressure-switch are shunted by the protective resistance, the circuit from the point of junction of the two solenoid-windings being completed through solenoid-winding 39 and wire 43 to the grounded wire 37, so as to keep the solenoid energized sufficiently to hold its core raised and keep the switch in its closed position. The solenoid-winding 39 in this connection is in shunt with the motor 34, but does not consume an appreciable amount of current, since it has the protective resistance 29 in series with it. The motor-switch remains closed, and the motor-compressor continues its operation of restoring pressure in the reservoir 46 until such pressure reaches its maximum, when it causes the gage-hand 12 to contact with the maximum contact-post 16, and so deënergize the solenoid 18 by connecting solenoid-winding 38 in shunt with solenoid-winding 39, with the current passing through them in such directions as to produce opposite effects, so that they neutralize each other. The circuit established by the maximum contact made by the pressure-switch is from the point in common to the two solenoid-windings, through solenoid-winding 38, the current passing in the opposite direction to its former passage therethrough, by wires 40 and 13 to the gage-hand 12, and across its contact with the maximum contact-post 16 to the ground through wire 37. The solenoid 18 being deënergized by having its two windings connected in opposition to each other allows its core 19 to drop, removing the contact-disk 20 from engagement with the spring-contacts 24 to open all circuits and engaging the spring-contacts 28 instead to short-circuit the protective resistance 29. It is desired to short-circuit the protective resistance 29 while the magnetic switch is open in order that when the minimum contact is again made by the pressure-switch the solenoid-winding 38 may receive a comparatively strong flow of current to enable it to successfully lift the core 19. This cycle of operation is repeated whenever it becomes necessary to restore pressure in the pressure system, the motor-compressor being caused to operate at the point of minimum pressure and continuing in its operation until the maximum pressure is reached.

By employing a magnetic switch whose winding is connected in shunt with the motor an inexpensive magnet of high resistance may be used to effectively accomplish the closing of the switch without consuming an appreciable quantity of current, especially when the protective resistance is employed in conjunction therewith, though this resistance may be omitted, if desired. Furthermore, the high resistance of the magnet-coil and the method of operation of the magnetic switch, by which it shunts the energizing contact made by the pressure-switch and the coil in series therewith and by which it becomes deënergized by its neutralized opposed windings, enable the pressure-switch to be made of the delicate mechanism which is essential to sensitive operation without danger of burning from carrying a considerable quantity of current or of arcing at the contacts. The pressure-switch is not relied upon to break any circuit, the circuit established by its minimum contact being so changed by the operation of the magnetic switch as to short-circuit such contact, and the circuit established by its maximum contact being opened by the opening of the magnetic switch.

While the mechanical construction illustrated in Figs. 1 and 2 is at present preferred by me for the purpose of exemplifying this invention, it is obvious that many other constructions may be employed without departing from the scope of the invention as defined by the claims.

At times such parts as the motor and the coils of the magnet have comparatively weak currents passing through them, entirely incapable of producing their operation, and when followed by the stronger current for effecting such operation the latter is referred to as being "established," notwithstanding the previous passage of the weak current, and is termed the "operating-current" or "energizing-current." Furthermore, as the solenoid or magnet is composed of different windings which may be separately energized it is referred to as "energized by the primary switch" or "connected in shunt with the motor" and the like, according to the condition of its energized winding. The various connections by which the desired functions of the several parts are produced are herein referred to as "means."

This application constitutes a division of my application for patent on automatic controllers for motor-compressors filed March 9, 1904, and bearing Serial No. 197,317.

What I claim as my invention is—

1. In a device of the character described, a solenoid comprising a pair of coils connected together, a primary switch adapted in one position to send current through one of the coils, a switch operated by the solenoid to shunt the said coil and the connection made by the primary switch and to send an energizing-current through the other coil in shunt with the motor to hold the switch in its operated position, said primary switch adapted in another position to connect the first-mentioned coil in multiple arc with the other coil to neutralize the effect of the same and release the main switch, and a motor-circuit controlled by the main switch.

2. A controller for pressure systems, comprising a motor-switch, a motor controlled by the switch, a magnet for operating the switch, a pressure-switch sensitive to variations of pressure in the pressure system for making a contact to energize one coil of the magnet, means controlled by the operation of the motor-switch for shunting the said coil of the magnet and energizing another coil of the magnet in shunt with the motor, and a circuit controlled by another contact of the pressure-switch for neutralizing the effect of the magnet to release the motor-switch.

3. A controller for pressure systems, comprising a switch, a motor controlled thereby, a magnet for operating the switch, a pressure-switch sensitive to variations of pressure in the pressure system adapted to make a contact for energizing the magnet, means dependent upon the operation of the switch for establishing a circuit connecting the magnet in shunt with the motor to retain the switch in its operated position, and a circuit controlled by another contact of the pressure-switch for neutralizing the effect of the magnet and releasing the switch.

4. A controller for pressure systems, comprising a switch, a magnet for operating the switch, and a pressure-switch sensitive to variations of pressure in the pressure system adapted to make a contact to energize the magnet by passing an energizing-current through a part of the winding thereof and thereby cause the operation of the switch, said switch when operated serving to shunt the said contact made by the pressure-switch and the part of the magnet-winding before referred to and establishing an energizing-circuit through another part of the winding of the magnet to retain the switch in its operated position, said pressure-switch being also adapted to make another contact for again establishing a circuit through the first-mentioned part of the magnet-winding to cause said part of the winding to act in opposition to the other part thereof so that the two parts neutralize each other and the magnet becomes deënergized to release the switch.

5. A pressure-controller for pressure systems, comprising a motor-switch, a motor-compressor controlled thereby, a magnet for operating the motor-switch, a pressure-switch sensitive to variations of pressure in the pressure system for making a contact to establish an energizing-circuit through a part of the magnet-winding and thereby energize the magnet and operate the switch, and a protective resistance normally short-circuited by the motor-switch in its released position, said switch in its operated position serving to shunt the said contact of the pressure-switch and the said part of the magnet-winding by means of the protective resistance, the operation of the motor-switch also serving to establish an energizing-circuit through another part of the magnet-winding to keep the magnet energized and retain the motor-switch in its operated position, the last-named circuit including the protective resistance in series with the said other part of the magnet-winding and both being in shunt with the motor-compressor, said pressure-switch being adapted to make another contact for establishing a circuit to connect the first-mentioned part of the magnet-winding in shunt with the other part thereof so that they neutralize each other to deënergize the magnet and release the motor-switch.

6. A controller for pressure systems comprising a base, a solenoid mounted thereon and having its winding formed in two parts, a casing inclosing the solenoid, a movable core for the solenoid, a switch-contact carried thereby, spring-contacts mounted on the solenoid-casing and insulated therefrom and adapted to be engaged by the switch-contact when the solenoid is energized, a pair of spring-arms beneath the solenoid adapted to be engaged by the switch-contact when the solenoid is deënergized, a coil of protective resistance mounted on the base and having the ends of its winding connected to the respective spring-arms, a pressure-gage sensitive to variations of pressure in a pressure system and also mounted on the base, adjustable contact-posts in the path of the gage-hand of the pressure-gage adapted to be engaged thereby at the minimum and maximum pressures of the pressure system respectively, a wire connecting the gage-hand with one end of one part of the solenoid-winding, a wire connecting the other end of said part of the solenoid-winding to one end of the other part of the solenoid-winding and to one of the spring-arms, a wire connecting the other end of the second-mentioned part of the solenoid-winding with the ground, a wire connecting the other spring-arm with one of the spring-contacts, a motor-compressor having connection therewith and with the ground, a wire leading from a suitable source of supply connecting with the other spring-contact and the minimum contact-post of the pressure-switch, and a wire connecting the maximum contact-post of the pressure-switch with the ground.

7. A pressure-controller, comprising a vertical base, a horizontal flange thereon, a solenoid surrounded by a casing which is secured in a vertical position on the base, a movable core for the solenoid, a disk-shaped switch-contact carried by the core, an insulating-plate between the disk contact and the end of the solenoid-casing, insulating-strips mounted on the sides of the solenoid-casing, spring-contacts carried by the insulating-strips, contact-shoes on the spring-contacts in the path of the disk-shaped contact to engage the edges thereof when said contact is raised by the solenoid, adjusting-screws threaded through the spring-contacts and bearing on the insulating-strips to adjust the position of the contact-shoes, insulating-blocks on the horizontal flange, spring-contact arms mounted thereon and having contact-shoes at their upwardly-bent free ends in the path of the disk-shaped contact to be engaged thereby when the solenoid is deënergized and the core drops, a pressure-gage mounted on the flange and having connection with a pressure system, said pressure-gage having a gage-hand sensitive to variations of pressure in the pressure system, contact-posts adjustably mounted in the path of the gage-hand to be engaged thereby, a coil of resistance-wire mounted on the base, and connecting means for the several parts whereby the contact made by the gage-hand with one of the contact-posts establishes an energizing-circuit through a part of the winding of the solenoid to energize said solenoid and lift the disk-shaped contact out of engagement with the contact-arms and into engagement with the spring-contacts, thereby shunting the said contact made by the gage-hand and the part of the solenoid-winding which was energized by said contact and establishing an energizing-circuit through the resistance-coil and another part of the winding of the solenoid, and the contact made by the gage-hand with the other contact-post serves to connect the first-mentioned part of the solenoid-winding in shunt with the other part thereof to neutralize the effect produced by said other part of the solenoid-winding and deënergize the solenoid, thereby permitting the core to drop and open all circuits and short-circuit the resistance-coil.

8. An automatic pressure-controller for pressure systems, comprising a motor-compressor, a magnetic switch for controlling the motor-circuit, and a pressure-switch sensitive to the variations of the pressure in the pressure system for establishing an energizing-circuit through a magnet-winding of the magnetic switch by one contact thereof, and a protective resistance, said magnetic switch being operated as the result of its magnet being energized by this circuit and serving to establish the motor-circuit and to shunt the said contact of the pressure-switch and the magnet-winding above mentioned and establish a circuit through the protective resistance in series with another magnet-winding of the magnetic switch, said magnet-winding and protective resistance being in shunt with the motor, the pressure-switch being adapted to make another contact for opposing one magnet-winding to the other and thus neutralizing the magnet and permitting the switch to open.

9. In a device of the character described, a solenoid comprising a pair of coils connected together, a motor, a primary switch, a switch adapted in one position to send an energizing-current through one of the coils and the motor in series, a switch operated by the solenoid to control the motor-circuit and to send an energizing-current through the other coil in shunt with the motor to hold the switch in its operated position, said primary switch adapted in another position to connect the first-mentioned coil in multiple arc with the other coil to neutralize the effect of the same and release the main switch.

In testimony whereof I affix my signature in presence of two witnesses.

WALTER J. RICHARDS.

Witnesses:
R. S. C. CALDWELL,
ANNA F. SCHMIDTBAUER.